United States Patent [19]
Owada

[11] Patent Number: 5,768,688
[45] Date of Patent: Jun. 16, 1998

[54] RADIO PORT TESTING METHOD AND MOBILE COMMUNICATION SYSTEM

[75] Inventor: Junichi Owada, Tokyo, Japan

[73] Assignee: NEC Corporation, Tokyo, Japan

[21] Appl. No.: 659,228

[22] Filed: Jun. 5, 1996

[30] Foreign Application Priority Data

Jun. 5, 1995 [JP] Japan ................. 7-138203

[51] Int. Cl.$^6$ ................. H04B 17/00
[52] U.S. Cl. ............ 455/67.1; 455/67.4; 455/424
[58] Field of Search .................. 455/423, 424, 455/38.2, 67.1, 67.4, 67.7, 9; 370/243, 246

[56] References Cited

U.S. PATENT DOCUMENTS

| | | | |
|---|---|---|---|
| 5,361,402 | 11/1994 | Grube et al. | 455/67.1 |
| 5,570,373 | 10/1996 | Wing | 455/423 |
| 5,606,729 | 2/1997 | D'Amico | 455/67.1 |

OTHER PUBLICATIONS

Operations Generic Criteria for PACS NE$_8$, Radio Port Control Unit (RPCU), GR-1344-CORE Issue 2, (1995) pp. 6-10.

Primary Examiner—Chi H. Pham
Attorney, Agent, or Firm—Foley & Lardner

[57] ABSTRACT

A mobile communication system has a radio port controller which continuously broadcasts information including a radio port identification through a radio port to be tested, and then specifies one of groups of mobile terminals and transmits a test paging message as many times as required to a coverage area of the radio port with respect to the specified group of mobile terminals. When a mobile terminal belonging to the specified group of mobile terminals receives the test paging message, it measures the quality of a downstream radio link. The mobile terminals transmits a test paging response message together with measured data of the quality of the downstream radio link and the radio port identification number to the radio port controller. In response to the test paging response message, the radio port controller confirms the normality or abnormality of a transmitter/receiver in the radio port based on the measured data of the quality of the downstream radio link if the radio port identification number received from the mobile terminal agrees with the radio port identification number of the radio port.

6 Claims, 6 Drawing Sheets

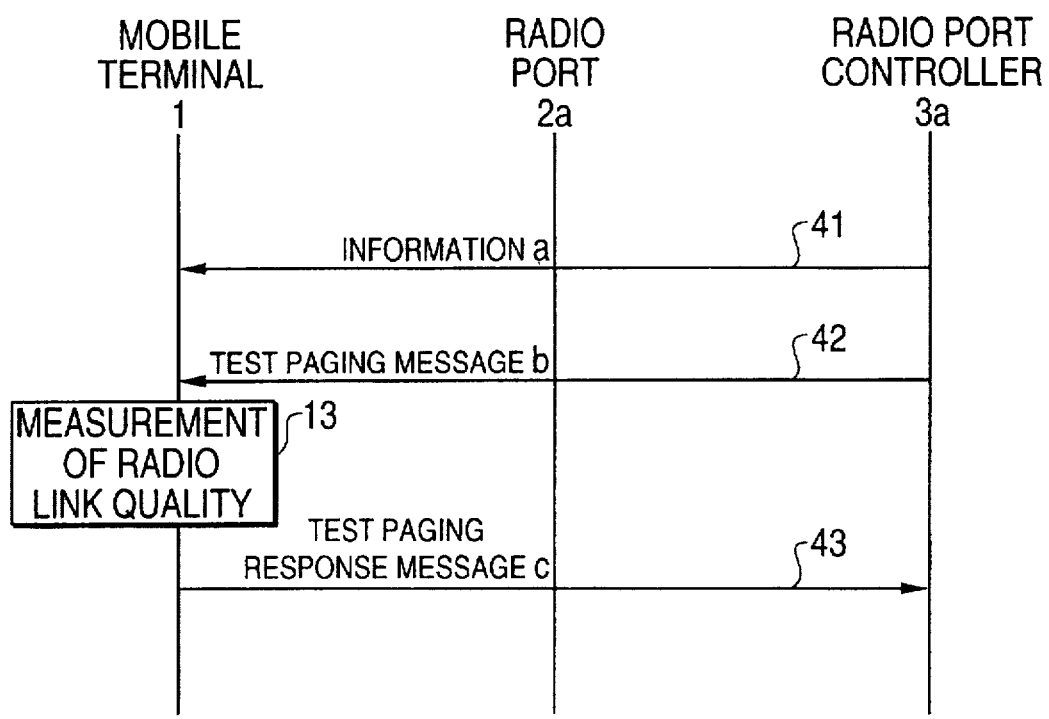
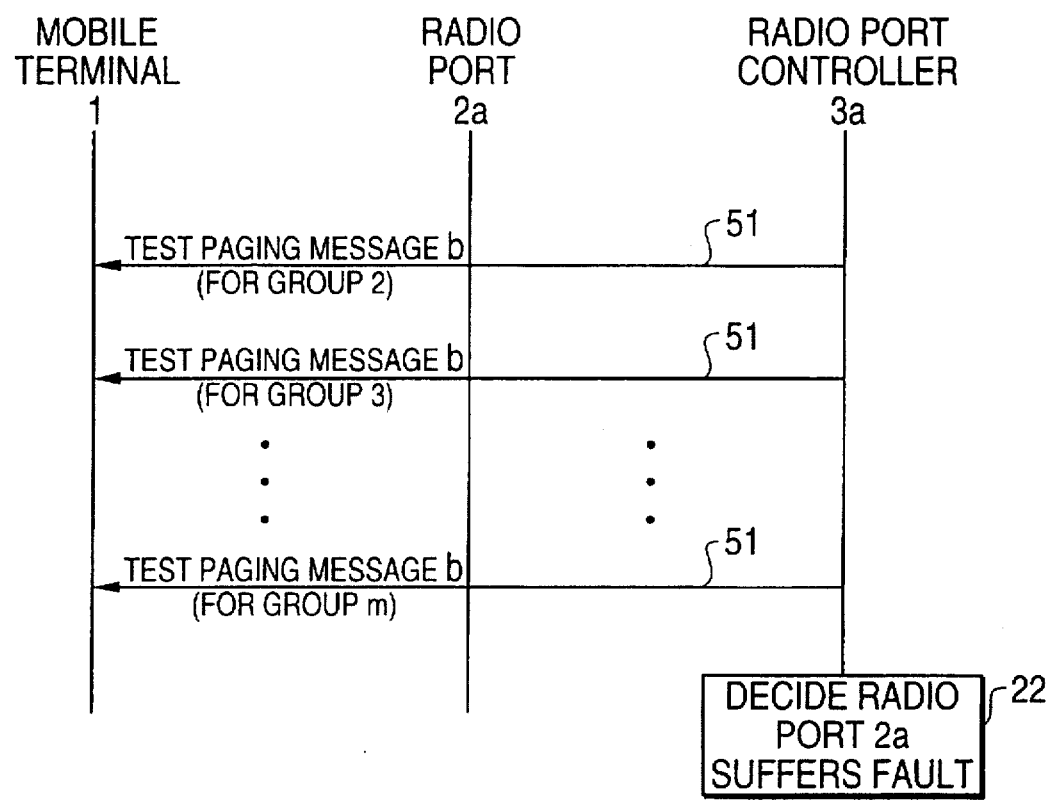

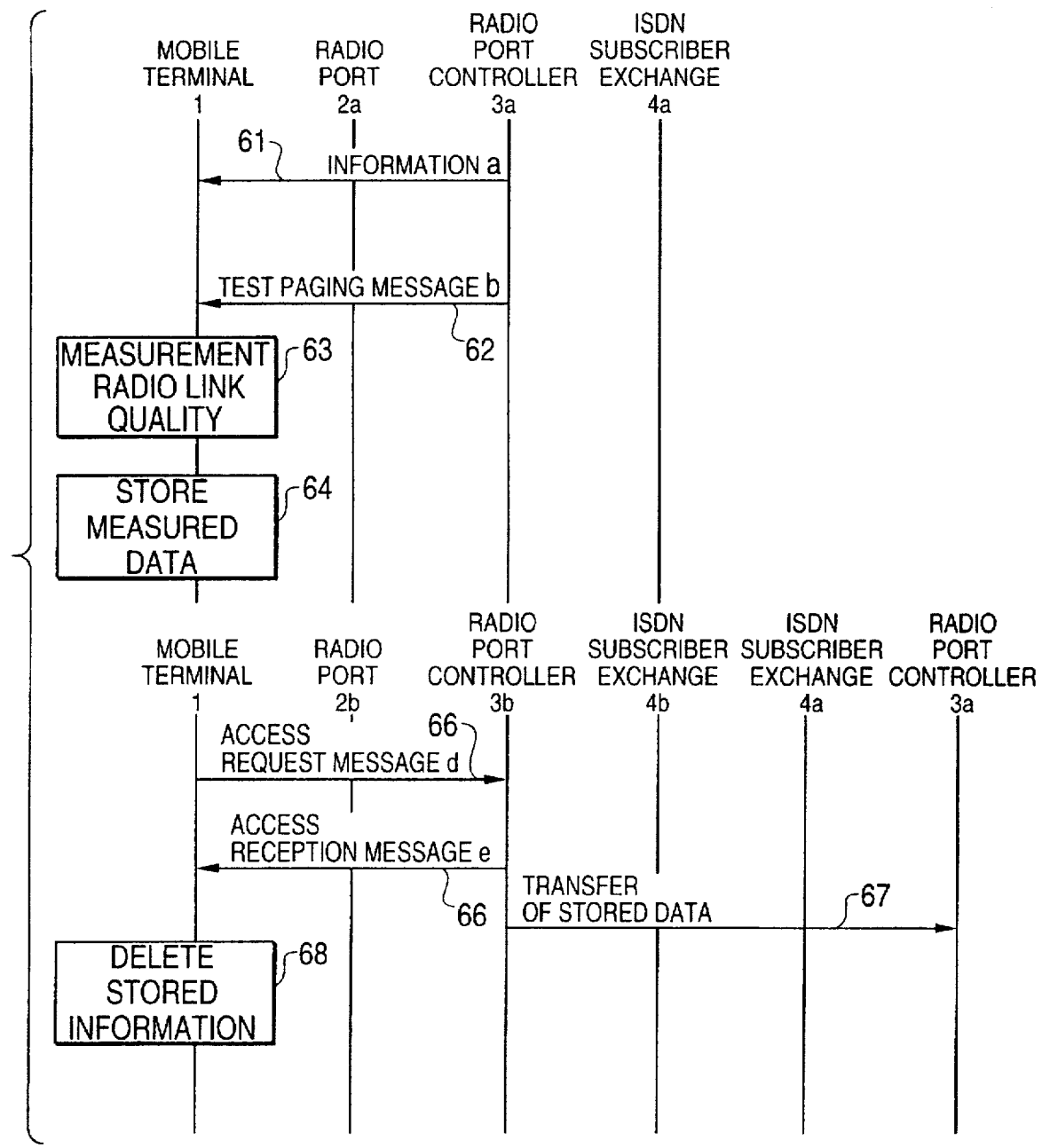

RADIO PORT TESTING METHOD AND MOBILE COMMUNICATION SYSTEM

BACKGROUND OF THE INVENTION

1. Field of the Invention

The present invention relates to a radio port testing method for a mobile communication system which comprises a plurality of groups of mobile terminals, at least one radio port, and a radio port controller, and is also concerned with a mobile communication system.

2. Description of the Prior Art

There have been available different processes for testing transmitter/receivers in radio ports of a mobile communication system. According to one process, transmitters and receivers in adjacent radio ports are used to confirm the normality of transmitter/receivers in radio ports being tested. According to another process, a mobile terminal present in a coverage area of a radio port being tested is paged on a test basis.

The former testing process can be carried out only in situations where adjacent radio ports are installed in a range or distance in which they can receive radio waves transmitted from the adjacent radio ports. The latter testing process, which is illustrated in FIG. 1 of the accompanying drawings, can be performed even when radio ports are not installed within the above range or in situations where radio waves transmitted from adjacent radio ports cannot be received due to an intervening obstacle such as a building.

With respect to the latter testing process, it has been proposed for all mobile terminals present in the coverage area of a tested radio port to respond immediately to a test paging message transmitted from a radio port controller through the tested radio port by adding measured data of the quality of a downstream radio link and the radio port identification number to a response message and transmitting them to the radio port controller. For details, see "Operations Genetic Criteria for MACS NEs", GR-1344-CORE Issue 1, Bellcore (1994).

The proposed testing process will be described below with reference to FIG. 1. When a radio port controller transmits a test paging message b' to mobile terminals present in the coverage area of a radio port being tested in a step 71, each of the mobile terminals measures the quality of the downstream radio link in a step 72. Since all the mobile terminals present in the coverage area transmit response messages c' almost simultaneously in a step 73, the entire system tends to cause a network congestion if many mobile terminals are present in the coverage area. In an attempt to avoid such a network congestion, the test may be conducted in a time zone where the traffic intensity is relatively low, but such a time zone may possibly see no mobile terminal at all present in the coverage area. Therefore, when the radio port controller does not receive any response message c', the radio port controller is unable to confirm whether its failure to receive any response message c' is caused because no mobile terminal is present in the coverage area or the transmitter/receiver in the radio port being tested suffers a fault.

To solve this problem, the test should be carried out in a time zone where at least one mobile terminal is present in the coverage area. The problem of network congestion may be eliminated by one of the following alternative processes: According to one testing process, the traffic intensity of the network is monitored, the test is conducted at a time which sees a remote possibility for a network congestion to occur. According to another proposal, mobile terminals are classified into groups, and the test is conducted separately on each of the groups of mobile terminals for thereby limiting the number of mobile terminals which can possibly respond to a test paging message. Still another testing process prevents simultaneous transmission of response messages from all mobile terminals present in the coverage area, i.e., controls mobile terminals to receive a test paging message from the radio port controller, measure the quality of the downstream radio link, and then reports the measured data to the radio port controller at randomly distributed times.

SUMMARY OF THE INVENTION

It is an object of the present invention to provide a radio port testing method capable of conducting a test paging process on mobile terminals without causing a network congestion due to response messages, and a mobile communication method and a mobile communication system which incorporate such a radio port testing method.

According to the present invention, there is provided a method of testing a radio port in a mobile communication system having a plurality of groups of mobile terminals, at least one radio port, and a radio port controller, comprising the steps of:

specifying one of the groups of mobile terminals with the radio port controller and transmitting a radio port identification number as downstream information and also transmitting a test paging message as many times as required from the radio port controller through the radio port to a coverage area of the radio port with respect to the specified group of mobile terminals;

measuring the quality of a downstream radio link with a mobile terminal belonging to the specified group in response to the test paging message transmitted from the radio port controller;

transmitting a test paging response message together with measured data of the quality of the downstream radio link and the radio port identification number from said mobile terminal to said radio port controller; and confirming the normality or abnormality of a transmitter/receiver in the radio port based on the measured data of the quality of the downstream radio link with the radio port controller if the radio port identification number received from the mobile terminal agrees with a radio port identification number of the radio port.

According to the present invention, the method may further comprise the step of:

transmitting said test paging message from said radio port controller with the radio port controller if the radio port controller detects that a service request has not been transmitted from the mobile terminal to said radio port controller for a predetermined time.

According to the present invention, the method may further comprise the steps of:

if a test paging response message has not been received from the specified group of mobile terminals within a predetermined period of time in response to said test paging message, specifying another one of the groups of mobile terminals and retransmitting the test paging message from the radio port controller to the coverage area of the radio port with respect to the specified group of mobile terminals;

repeating retransmission of the test paging message from the radio port controller to the coverage area of the radio port with respect to other specified groups of mobile terminals; and if a test paging response message has not been received from all the groups of mobile terminals, deciding in the radio port controller that the transmitter/receiver in the radio port suffers a fault.

According to the present invention, there is further provided a mobile communication method in a mobile communication system having a plurality of groups of mobile terminals, at least one radio port, and a radio port controller, comprising the steps of:

specifying one of the groups of mobile terminals with the radio port controller and transmitting a radio port identification number and a position registration area identification number as downstream information and also transmitting a test paging message together with test execution time information as many times as required from the radio port controller through the radio port to a coverage area of the radio port with respect to the specified group of mobile terminals;

measuring the quality of a downstream radio link with a mobile terminal belonging to the specified group according to the test execution time information in response to the test paging message transmitted from the radio port controller, and storing information including measured data of the quality of the downstream radio link, the test execution time information, the radio port identification number, and the position registration area identification number in said mobile terminal;

transmitting an access request message together with the stored information from the mobile terminal to the radio port controller when the mobile terminal accesses the radio port controller for the first time after it has finished the measurement of the quality of the downstream radio link; and transmitting an access reception message together with a stored information deletion command from said radio port controller to said mobile terminal in response to the access request message transmitted together with the stored information, identifying the radio port controller which has transmitted the test paging message based on the radio port identification number and the position registration area identification number in the stored information, transferring the stored information to the identified radio port controller if the identified radio port controller is another radio port controller, and confirming the normality or abnormality of a transmitter/receiver in the radio port based on the test execution time information and the measured data of the quality of the downstream radio link in the stored information if the identified radio port controller is not another radio port controller or the radio port controller is identified based on the radio port identification number and the position registration area identification number in the stored information; and deleting the stored information from the mobile terminal in response to said stored information deletion command transmitted together with the access reception message from said radio port controller to said mobile terminal.

According to the present invention, there is also provided a mobile communication system comprising:

a plurality of groups of mobile terminals;
at least one radio port; and
a radio port controller;
each of said mobile terminals comprising:
means for receiving a test paging message;
means responsive to a test paging message transmitted from the radio port controller to a group to which the mobile terminal belongs, for measuring the quality of a downstream radio link; and means for transmitting a test paging response message, together with measured data of the quality of a downstream radio link and a radio port identification number transmitted as downstream information, to said radio port controller;

said radio port controller comprising:
means for specifying one of the groups of mobile terminals and transmitting said test paging message as many times as required through a radio port to be tested to the specified group of mobile terminals;

means for receiving the test paging response message; and means for confirming the normality or abnormality of a transmitter/receiver in the radio port based on the measured data of the quality of the downstream radio link if the radio port identification number in the test paging response message received from the mobile terminal agrees with a radio port identification number of the radio port.

According to the present invention, there is further provided a mobile communication system comprising:
a plurality of mobile terminals;
at least one radio port; and
a radio port controller;
each of said mobile terminals comprising:
means for receiving a test paging message;
means responsive to a test paging message for measuring the quality of a downstream radio link according to test execution time information contained in said test paging message;

means for storing information including measured data of the quality of the downstream radio link, said test execution time information, a radio port identification number and a position registration area identification number transmitted as downstream information;

means for transmitting an access request message together with the stored information to the radio port controller when the mobile terminal accesses the radio port controller for the first time after it has finished the measurement of the quality of the downstream radio link; and means for deleting the stored information in response to a stored information deletion command transmitted together with an access reception message from said radio port controller to said mobile terminal;

said radio port controller comprising:
means for transmitting said test paging message together with said test execution time information as many times as required through a radio port to be tested;

means for receiving the access request message;

means for transmitting said access reception message together with said stored information deletion command to said mobile terminal in response to the access request message transmitted together with the stored information;

means for identifying the radio port controller which has transmitted the test paging message based on the radio port identification number and the position registration area identification number in the stored information;

means for transferring the stored information to the identified radio port controller if the identified radio port controller is another radio port controller; and means for confirming the normality or abnormality of a transmitter/receiver in the radio port to be tested on the test execution time information and the measured data of the quality of the downstream radio link in the stored information if the identified radio port controller is not another radio port controller or the radio port controller is identified based on the radio port identification number and the position registration area identification number in the stored information.

When mobile terminals are paged on a test basis to confirm the normality of a transmitter/receiver in a radio port, the number of mobile terminals which transmit measured data of the quality of downstream radio links is limited by specifying a group of mobile terminals, specifying a radio port identification number, or testing the radio port when the mobile communication system has a relatively low traffic intensity.

The above and other objects, features, and advantages of the present invention will become apparent from the following description with reference to the accompanying drawings which illustrate examples of the present invention.

BRIEF DESCRIPTION OF THE DRAWINGS

FIG. 4 is a sequence diagram of a radio port testing method according to the first embodiment;

FIG. 5 is a sequence diagram of the radio port testing method according to the first embodiment, with no response message received from specified groups of mobile terminals; FIG. 7 is a sequence diagram of a radio port testing method according to the second embodiment.

DETAILED DESCRIPTION OF THE PREFERRED EMBODIMENTS

Figure 1:
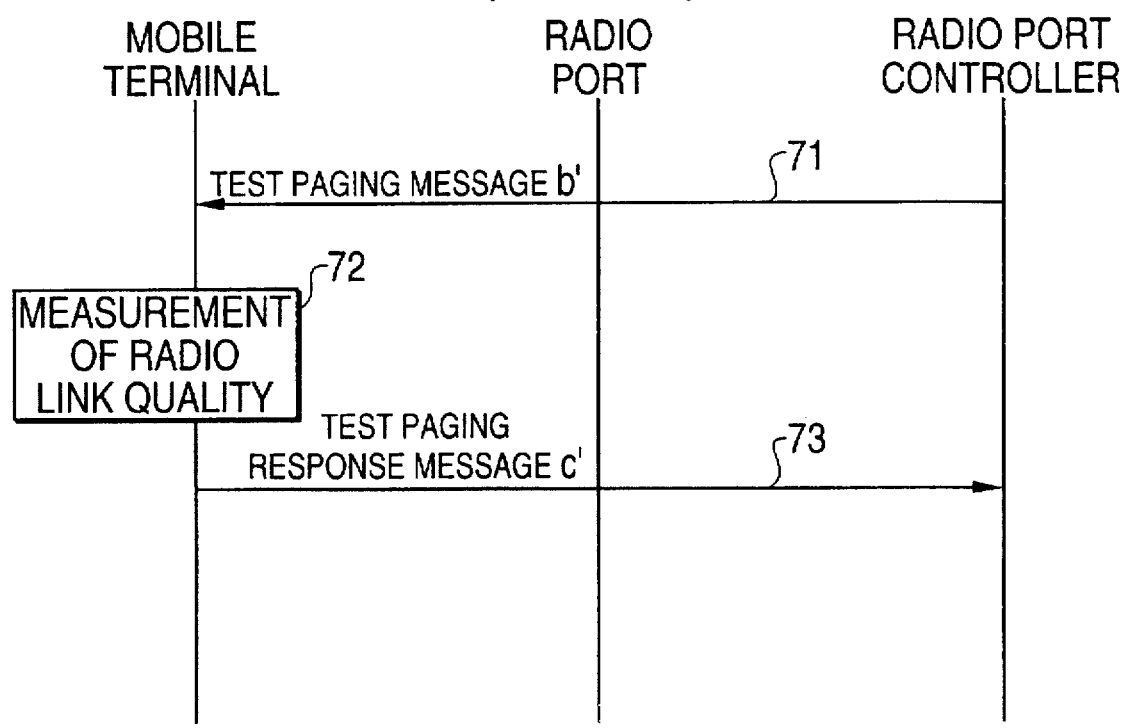
FIG. 1 is a sequence diagram of a conventional radio port testing process.
Figure 2:
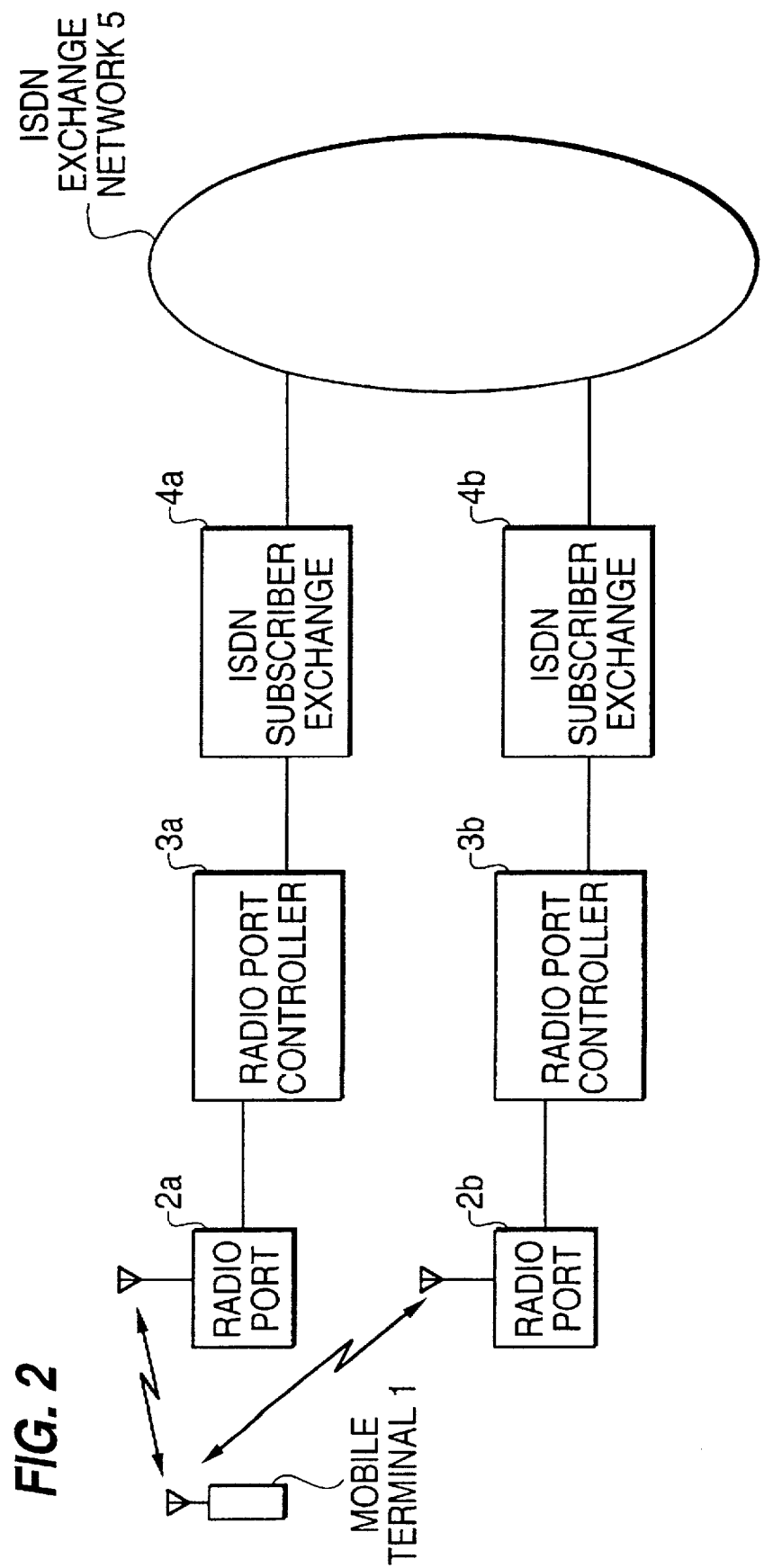
FIG. 2 is a block diagram of a mobile communication system according to the present invention.

Mobile communication system:

FIG. 2 shows in block form a mobile communication system according to the present invention. As shown in FIG. 2, the mobile communication system comprises a mobile terminal 1, a pair of radio ports 2a, 2b, a pair of radio port controllers 3a, 3b, a pair of ISDN (Integrated-Services Digital Network) subscriber exchanges 4a, 4b, and an ISDN exchange network 5.

Figure 3A:
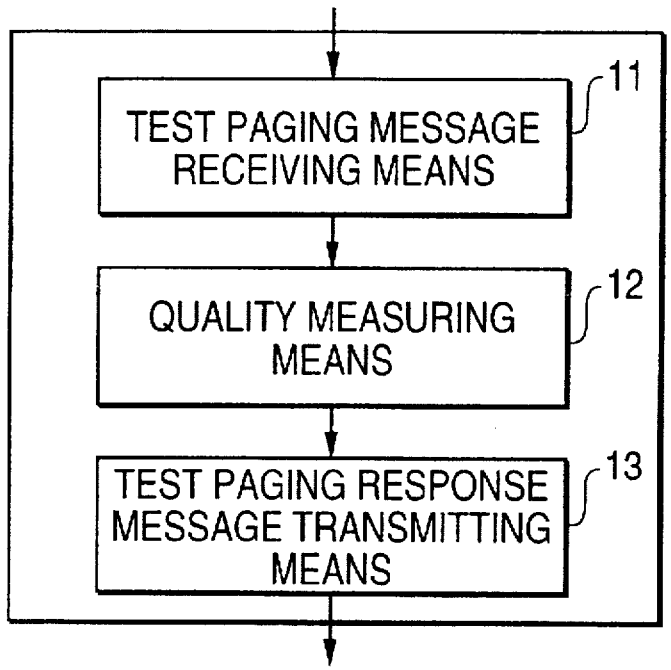
FIGS. 3A and 3B are block diagrams of a mobile terminal 1 and radio port controllers 3a, 3b according to a first embodiment of the present invention.

The mobile terminal 1 has a capability to transmit and receive radio signals and also a capability to measure the quality of a downstream radio link. The radio ports 2a, 2b belong to different position registration areas, respectively, effect radio communications with the mobile terminal 1, and are connected respectively to the radio port controllers 3a, 3b. The radio port controllers 3a, 3b are connected respectively to the ISDN subscriber exchanges 4a, 4b, connect a call to the mobile subscriber, transmit a test paging message for confirming the normality of transmitter/receivers of the radio ports 2a, 2b, and determine the normality of transmitter/receivers of the radio ports 2a, 2b based on the measured quality of the downstream radio link which is transmitted back from the mobile terminal 1. Radio port testing method according to 1st embodiment:

As shown in FIG. 3A, the mobile terminal 1 comprises a test paging message receiving means 11; quality measuring means 12 responsive to a test paging message transmitted from the radio port controller 3a or 3b to a group to which the mobile terminal 3a or 3b belongs, for measuring the quality of a downstream radio link; and a test paging response message transmitting means 13 for transmitting a test paging response message, together with measured data of the quality of a downstream radio link and a radio port identification number transmitted as downstream information, to said radio port controller.

Figure 3B:
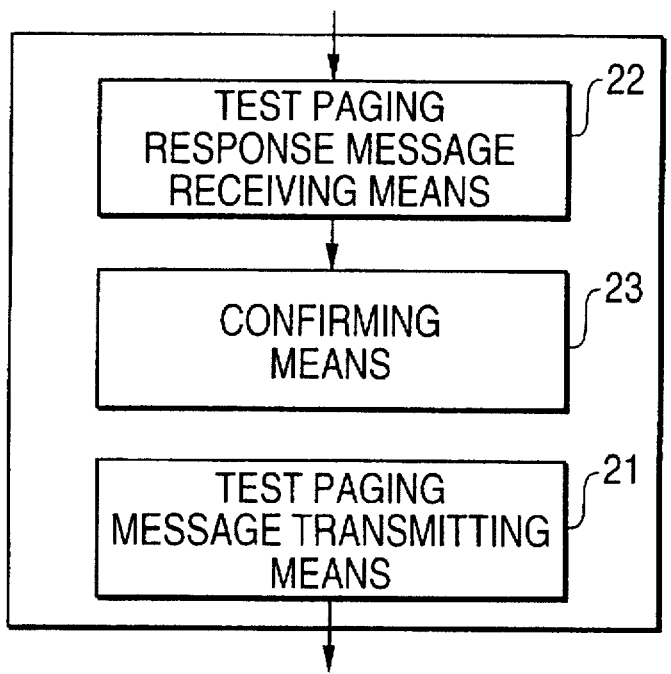

As shown in FIG. 3B, the radio port controllers 3a and 3b comprise a test paging message transmitting means 21 for specifying one of the groups of mobile terminals and transmitting the test paging message as many times as required through the radio port 2a or 2b to be tested to the specified group of mobile terminals; a test paging response message receiving means 22; and confirming means 23 for confirming the normality of abnormality of a transmitter/receiver in the radio port 2a or 2b based on the measured data of the quality of the downstream radio link if the radio port identification number in the test paging response message received from the mobile terminal 1 agrees with a radio port identification number of the radio port 2a or 2b.

A sequence of operation of the mobile communication system based on a radio port testing method according to a first embodiment of the present invention will be described below with reference to FIG. 4. In FIG. 4, the radio port controller 3a continuously broadcasts a radio port identification number as downstream information "a" through the radio port 2a which is to be tested, in a step 41. For effecting a test paging process to confirm the normality of the radio port 2a, the radio port controller 3a specifies one of groups of mobile terminals to be paged, and transmits a test paging message "b" as many times as required to the coverage area of the radio port 2a through the radio port 2a with respect to the specified group of mobile terminals, in a step 42. When the mobile terminal 1 which belongs to the specified group to be paged receives the test paging message "b", the mobile terminal 1 measures the quality of the downstream radio link in a step 43. When the mobile terminal 1 finishes the measurement of the quality of the downstream radio link, the mobile terminal 1 adds measured data and the radio port identification number contained in the downstream information "a" to a test paging response message "c", and transmits test paging response message "c" to the radio port controller 3a in a step 44. When the radio port controller 3a receives the test paging response message "c", the radio port controller 3a confirms that the radio port identification number added to the test paging response message "c", is a radio port identification number corresponding to the radio port 2a, and thereafter confirms the normality or abnormality of the radio port 2a based on the measured data of the quality of the downstream radio link.

In the operation sequence shown in FIG. 4 based on the radio port testing method according to the above embodiment, if the mobile terminals belonging to the specified group simultaneously transmit the test paging response message "c", then the mobile communication system may possibly suffer a network congestion. To avoid such a network congestion, the radio port controller 3a monitors a service request, such as a call to a mobile terminal, a call from a mobile terminal, a position registration request, or the like, which is directed to itself, and conducts a radio port test as shown in FIG. 4 only when such a service request has not been generated for a predetermined period of time. The radio port controller 3a can also avoid a network congestion by limiting a mobile terminal paging number within one group of mobile terminals to be paged, and conducting a radio port test with respect to the limited mobile terminal paging number.

Figure 6A:
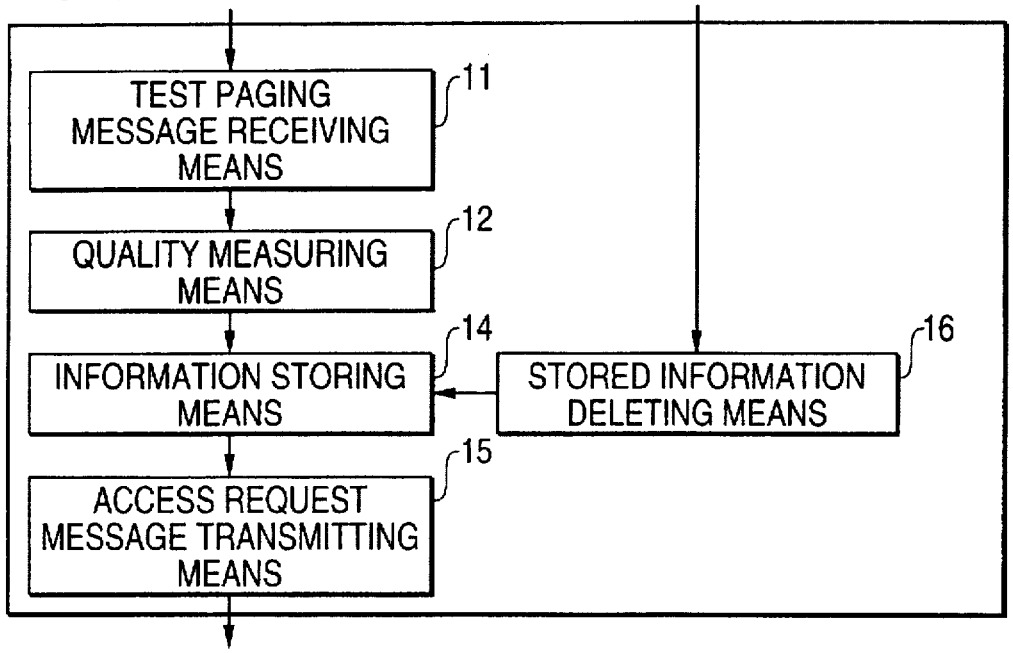
FIGS. 6A and 6B are block diagrams of the mobile terminal 1 and radio port controllers 3a, 3b according to a second embodiment of the invention; with a mobile terminal temporarily storing measured data of the quality of a downstream radio link.
Figure 6B:
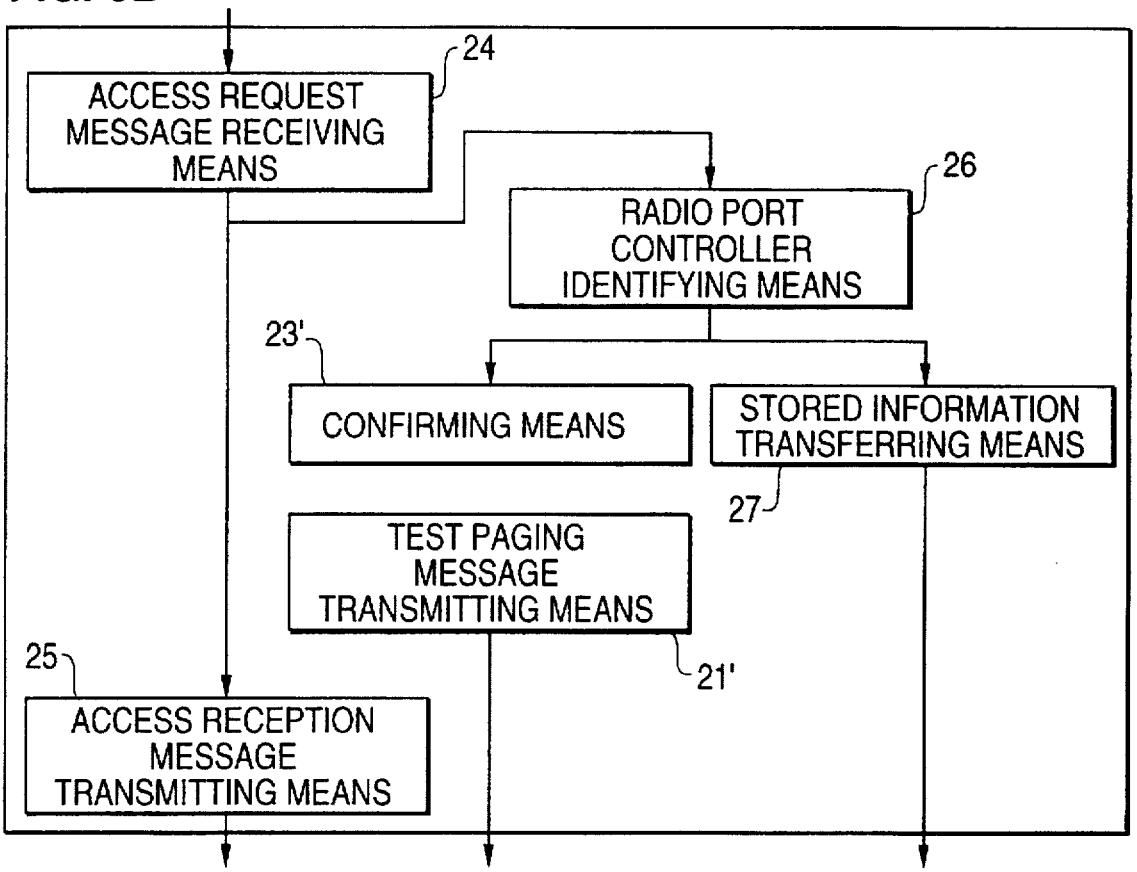

FIG. 5 shows another operation sequence of the radio port testing method according to the first embodiment of the present invention. In the operation sequence shown in FIG. 5, the radio port controller 3a receives no response message "c" from a specified group of mobile terminals within a predetermined period of time in response to a test paging message "b" transmitted from the radio port controller 3a. Specifically, the radio port controller 3a specifies another group of mobile terminals to be tested, which has not been specified in the previous cycle, among a plurality of groups of mobile terminals. Then, the radio port controller 3a retransmits the test paging message "b", as many times as required to the coverage area of the radio port 2a through the radio port 2a with respect to the specified group of mobile terminals, in a step 51. If the radio port controller 3a receives no response message "c" after it has transmitted the test paging message "b" to the coverage area of the radio port 2a with respect to all the groups of mobile terminals, then the radio port controller 3a decides that the transmitter/receiver in the radio port 2a suffers a fault, and carries out a predetermined fault process in a step 52. Radio port testing method according to 2nd embodiment:

As shown in FIG. 6A, the mobile terminal 1 comprises a test paging message receiving means 11; a quality measuring means 12 responsive to a test paging message for measuring the quality of a downstream radio link according to test execution time information contained in the test paging message; an information storing means 14 for storing information including measured data of the quality of the downstream radio link, the test execution time information, a radio port identification number and a position registration area identification number transmitted as downstream information; an access request transmitting means 15 for transmitting an access request message together with the stored information to the radio port controller 3a or 3b when the mobile terminal 1 accesses the radio port controller 3a or 3b for the first time after it has finished the measurement of the quality of the downstream radio link; and a stored information deleting means 16 for deleting the stored information in response to a stored information deletion command transmitted together with an access reception message from the radio port controller 3a or 3b to the mobile terminal 1;

As shown in FIG. 6B, the radio controller 3a and 3b comprise a test paging message transmitting means 21 for transmitting the test paging message together with the test execution time information as many times as required through a radio port to be tested; an access request message receiving means 24; an access reception message transmitting means 25 for transmitting the access reception message together with said stored information deletion command to said mobile terminal in response to the access request message transmitted together with the stored information; a radio port controller identifying means 26 for identifying the radio port controller 3a or 3b which has transmitted the test paging message based on the radio port identification number and the position registration area identification number in the stored information; a stored information transferring means 27 for transferring the stored information to the identified radio port controller if the identified radio port controller is another radio port controller; and confirming means 23' for confirming the normality or abnormality of a transmitter/receiver in the radio port 2a or 2b to be tested, based on the test execution time information and the measured data of the quality of the downstream radio link in the stored information if the identified radio port controller is not another radio port controller or the radio port controller is identified based on the radio port identification number and the position registration area identification number in the stored information.

FIG. 7 shows another operation sequence of the mobile communication system based on a radio port testing method according to a second embodiment of the present invention. In FIG. 7, the radio port controller 3a continuously broadcasts a radio port identification number and a position registration area identification number as information "a" through the radio port 2a which is to be tested, in a step 61. For effecting a test paging process to confirm the normality of the radio port 2a, the radio port controller 3a adds test execution time information to a test paging message "b" and transmits test paging message "b" as many times as required to the coverage area of the radio port 2a through the radio port 2a, in a step 62. When the mobile terminal 1 receives the test paging message "b", the mobile terminal 1 measures the quality of the downstream radio link according to the test execution time information added to the test paging message "b" in a step 63. When the mobile terminal 1 finishes the measurement of the quality of the downstream radio link, the mobile terminal 1 stores therein information including the measured data of the quality of the downstream radio link, the test execution time information, the radio port identification number and the position registration area identification number in a step 64.

When the mobile terminal 1 subsequently accesses the network to make a call, receive a call, or request position registration for the first time after it has finished the measurement of the quality of the downstream radio link, the mobile terminal 1 adds the stored information to an access request message "d", and transmits the access request message "d" through the radio port 2b to the radio port controller 3b in a step 65. When the radio port controller 3b receives the access request message "d", the radio port controller 3b confirms that the stored information is added to the access request message "d", adds a stored information deletion command to an access reception message "e", and transmits the access reception message "e" to the mobile terminal 1 in a step 66. Then, the radio port controller 3b identifies the radio port controller 3a which has transmitted the test paging message "b" based on the radio port identification number and the position registration area identification number in the stored information, and transfers the stored information to the radio port controller 3a in a step 67. When the radio port controller 3a receives the stored information from the radio port controller 3b, the radio port controller 3a confirms that the stored information which it has received corresponds to the test paging message "b" which it has transmitted, based on the radio port identification number and the position registration area identification number, and also confirms the normality of the tested radio port 2a based on the test execution time information and the measured data of the quality of the downstream radio link. Finally, the mobile terminal 1 deletes the stored information in a step 68.

The radio port testing methods according to the first and second embodiments may be combined with each other for the purpose of avoiding a network congestion. Specifically, a group of mobile terminals to be subjected to a test paging process may be specified according to the first embodiment, and the mobile terminals in the specified group may store measured data of the quality of the downstream radio link according to the second embodiment. The combination of the radio port testing methods according to the first and second embodiments makes it possible to reduce the burden imposed on the network.

While preferred embodiments of the present invention have been described using specific terms, such description is for illustrative purposes only, and it is to be understood that changes and variations may be made without departing from the spirit or scope of the following claims.

What is claimed is:

1. A method of testing a radio port in a mobile communication system having a plurality of groups of mobile terminals, at least one radio port, and a radio port controller, comprising the steps of:

specifying one of the groups of mobile terminals with the radio port controller and transmitting a radio port identification number as downstream information and also transmitting a test paging message as many times as required from the radio port controller through the radio port to a coverage area of the radio port with respect to the specified group of mobile terminals;

measuring the quality of a downstream radio link with a mobile terminal belonging to the specified group in response to the test paging message transmitted from the radio port controller;

transmitting a test paging response message together with measured data of the quality of the downstream radio link and the radio port identification number from said mobile terminal to said radio port controller; and confirming the normality or abnormality of a transmitter/receiver in the radio port based on the measured data of the quality of the downstream radio link with the radio port controller if the radio port identification number received from the mobile terminal agrees with a radio port identification number of the radio port.

2. A method according to claim 1, further comprising the step of:

transmitting said test paging message from said radio port controller with the radio port controller if the radio port controller detects that a service request has not been transmitted from the mobile terminal to said radio port controller for a predetermined time.

3. A method according to claim 1, further comprising the steps of:

if a test paging response message has not been received from the specified group of mobile terminals within a predetermined period of time in response to said test paging message, specifying another one of the groups of mobile terminals and retransmitting the test paging message from the radio port controller to the coverage area of the radio port with respect to the specified group of mobile terminals;

repeating retransmission of the test paging message from the radio port controller to the coverage area of the radio port with respect to other specified groups of mobile terminals; and if a test paging response message has not been received from all the groups of mobile terminals, deciding in the radio port controller that the transmitter/receiver in the radio port suffers a fault.

4. A mobile communication method in a mobile communication system having a plurality of groups of mobile terminals, at least one radio port, and a radio port controller, comprising the steps of:

specifying one of the groups of mobile terminals with the radio port controller and transmitting a radio port identification number and a position registration area identification number as downstream information and also transmitting a test paging message together with test execution time information as many times as required from the radio port controller through the radio port to a coverage area of the radio port with respect to the specified group of mobile terminals;

measuring the quality of a downstream radio link with a mobile terminal belonging to the specified group according to the test execution time information in response to the test paging message transmitted from the radio port controller, and storing information including measured data of the quality of the downstream radio link, the test execution time information, the radio port identification number, and the position registration area identification number in said mobile terminal;

transmitting an access request message together with the stored information from the mobile terminal to the radio port controller when the mobile terminal accesses the radio port controller for the first time after it has finished the measurement of the quality of the downstream radio link; and transmitting an access reception message together with a stored information deletion command from said radio port controller to said mobile terminal in response to the access request message transmitted together with the stored information, identifying the radio port controller which has transmitted the test paging message based on the radio port identification number and the position registration area identification number in the stored information, transferring the stored information to the identified radio port controller if the identified radio port controller is another radio port controller, and confirming the normality or abnormality of a transmitter/receiver in the radio port based on the test execution time information and the measured data of the quality of the downstream radio link in the stored information if the identified radio port controller is not another radio port controller or the radio port controller is identified based on the radio port identification number and the position registration area identification number in the stored information; and deleting the stored information from the mobile terminal in response to said stored information deletion command transmitted together with the access reception message from said radio port controller to said mobile terminal.

5. A mobile communication system comprising:

a plurality of groups of mobile terminals;

at least one radio port; and a radio port controller;

each of said mobile terminals comprising:

means for receiving a test paging message;

means responsive to a test paging message transmitted from the radio port controller to a group to which the mobile terminal belongs, for measuring the quality of a downstream radio link, and a means for transmitting a test paging response message, together with measured data of the quality of a downstream radio link and a radio port identification number transmitted as downstream information, to said radio port controller;

said radio port controller comprising:

means for specifying one of the groups of mobile terminals and transmitting said test paging message as many times as required through a radio port to be tested to the specified group of mobile terminals;

means for receiving said test paging response message; and means for confirming the normality or abnormality of a transmitter/receiver in said radio port based on the measured data of the quality of the downstream radio link if the radio port identification number in the test paging response message received from the mobile terminal agrees with a radio port identification number of the radio port.

6. A mobile communication system comprising:

a plurality of mobile terminals;

at least one radio port; and a radio port controller;

each of said mobile terminals comprising:

means for receiving a test paging message;

means responsive to a test paging message for measuring the quality of a downstream radio link according to test execution time information contained in said test paging message;

means for storing information including measured data of the quality of the downstream radio link, said test execution time information, a radio port identification number and a position registration area identification number transmitted as downstream information;

means for transmitting an access request message together with the stored information to the radio port controller when the mobile terminal accesses the radio port controller for the first time after it has finished the measurement of the quality of the downstream radio link; and means for deleting the stored information in response to a stored information deletion command transmitted together with an access reception message from said radio port controller to said mobile terminal;

said radio port controller comprising:

means for transmitting said test paging message together with said test execution time information as many times as required through a radio port to be tested;

means for receiving said access request message;

means for transmitting said access reception message together with said stored information deletion command to said mobile terminal in response to the access request message transmitted together with the stored information;

means for identifying the radio port controller which has transmitted the test paging message based on the radio port identification number and the position registration area identification number in the stored information;

means for transferring the stored information to the identified radio port controller if the identified radio port controller is another radio port controller; and means for confirming the normality or abnormality of a transmitter/receiver in the radio port to be tested, based on the test execution time information and the measured data of the quality of the downstream radio link in the stored information if the identified radio port controller is not another radio port controller or the radio port controller is identified based on the radio port identification number and the position registration area identification number in the stored information.

* * * * *